United States Patent [19]
Brennan

[11] Patent Number: 4,776,485
[45] Date of Patent: Oct. 11, 1988

[54] FOOD SERVICE TRAY ADAPTED TO HEAT FOOD THROUGH THE TRAY HAVING MEANS FOR MOUNTING AN INSULATING COVER IN AN INVERTED POSITION UNDER THE TRAY

[75] Inventor: Edward J. Brennan, Litchfield, Conn.
[73] Assignee: PTC Aerospace Inc., Bantam, Conn.
[21] Appl. No.: 43,098
[22] Filed: Apr. 27, 1987
[51] Int. Cl.$^4$ .................. B65D 43/04; B65D 73/00
[52] U.S. Cl. .................. 220/352; 220/23.83; 220/306; 206/564; 206/486
[58] Field of Search .......... 220/23.83, 23.6, 23.8, 220/306, 354, 352, 405, 406; 206/564, 557, 558, 562, 486, 488, 490; 165/2, 48 R, 30; 219/386

[56] References Cited

U.S. PATENT DOCUMENTS

| | | | |
|---|---|---|---|
| Re. 30,623 | 5/1981 | Schulz et al. | 165/48 R |
| Re. 30,962 | 6/1982 | Bridges | 220/23.6 |
| 3,305,124 | 10/1965 | Whiteford | 206/564 |
| 3,608,770 | 9/1971 | Naimoli | 220/16 |
| 3,642,165 | 2/1972 | von der Osten | 220/23.83 |
| 3,647,104 | 3/1972 | Goings | 220/20 |
| 3,877,603 | 4/1975 | Holz | 220/23.83 |
| 3,944,109 | 3/1976 | Holz | 220/23.83 |
| 4,005,745 | 2/1977 | Colato et al. | 165/2 |
| 4,346,757 | 8/1982 | Dodd et al. | 165/48 R |
| 4,386,703 | 6/1983 | Thompson et al. | 206/557 |
| 4,886,346 | 5/1975 | Meyers | 219/386 |

FOREIGN PATENT DOCUMENTS

| | | | |
|---|---|---|---|
| 1205953 | 8/1959 | France | 220/23.8 |
| 1219352 | 12/1959 | France | 165/30 |
| 1234794 | 5/1960 | France | 220/23.8 |

Primary Examiner—Willis Little
Attorney, Agent, or Firm—Barry L. Clark

[57] ABSTRACT

A food service tray, preferably formed of molded plastic, is particularly adapted to be used in a service cart which can heat food contained in a predetermined "hot" area of the tray. The tray has a generally flat planar portion from which the side walls of at least one dish-shaped recess extend both upwardly and downwardly. The said at least one dish-shaped recess preferably contains a disposable insert dish and has a bottom surface which is thinner than other portions of the tray in order to facilitate the transfer of heat to food contained in the dish. Integral ribs formed on the lower outer side walls of the recess serve to resiliently and frictionally engage the dish's cover after it has been removed and inverted. In the inverted position, the cover insulates the hot bottom of the tray during serving. The tray preferably also includes a second downwardly recessed portion for cold food, cups and utensils. This second recessed portion extends down further than the said at least one dish-shaped recess by the thickness of the cover.

21 Claims, 2 Drawing Sheets

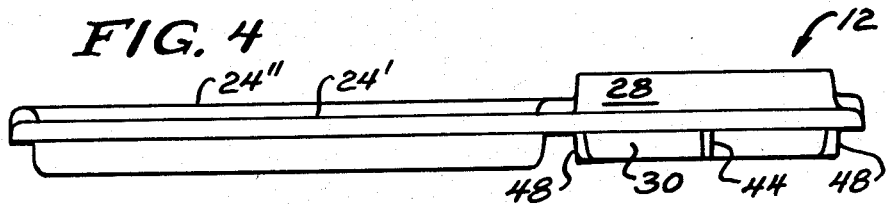
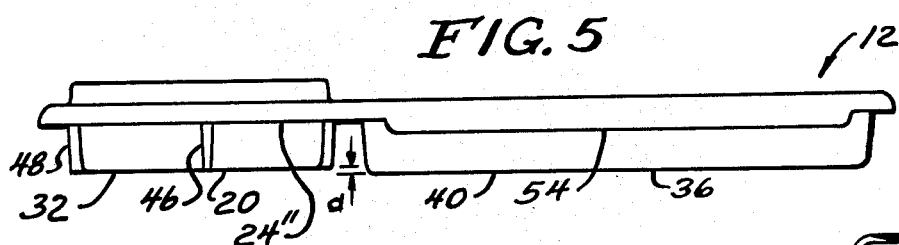
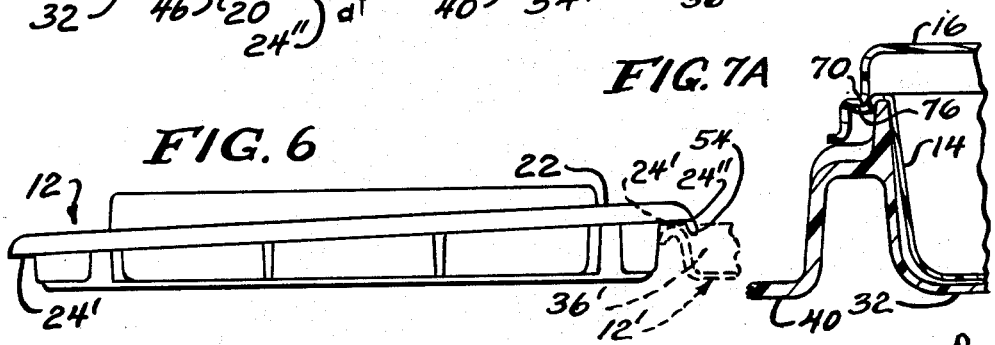
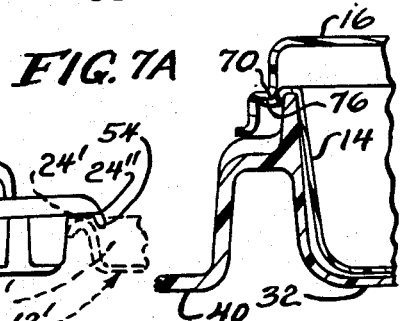
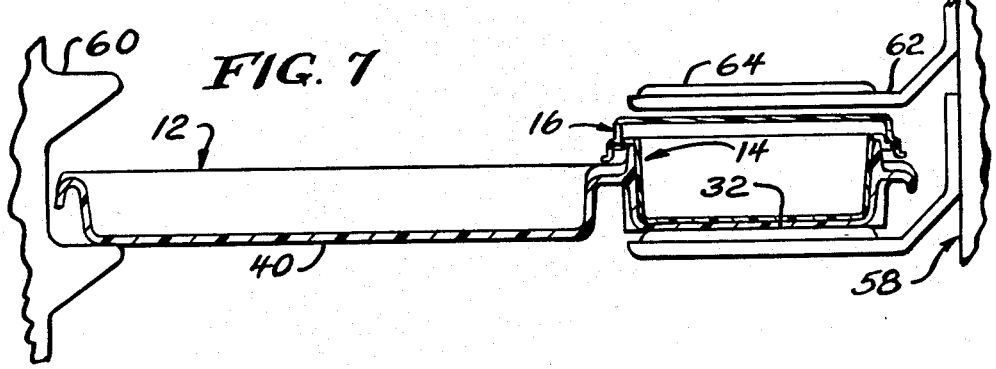
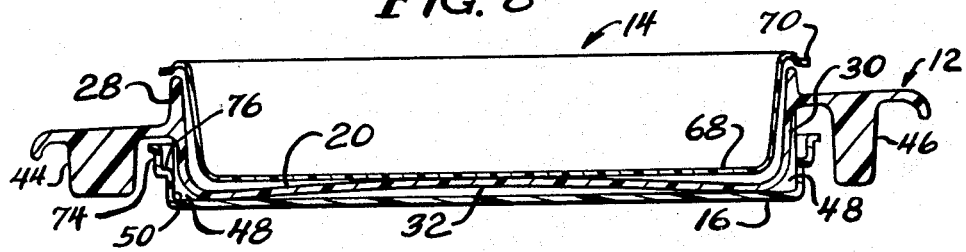

FOOD SERVICE TRAY ADAPTED TO HEAT FOOD THROUGH THE TRAY HAVING MEANS FOR MOUNTING AN INSULATING COVER IN AN INVERTED POSITION UNDER THE TRAY

BACKGROUND OF THE INVENTION

The invention relates to food serving systems, and particularly to food serving trays of the type used in such systems in transportation vehicles such as aircraft and trains and in institutional feeding locations such as hospitals. More particularly, the invention relates to food serving trays of the type which are adapted to permit the heating of one or more food items thereon while other food items are either chilled or isolated from the heating element. Examples of such trays include those disclosed in Schulz et al U.S. Pat. No. Re. 30,623 and Dodd et al U.S. Pat. No. 4,346,756 wherein a heater shelf is moved above the tray surface and under a dish which is lifted by the heater shelf. Tricault French Pat. No. 1,219,352, Colato et al U.S. Pat. No. 4,005,745 and Naimoli U.S. Pat. No. 3,608,770 teach the concept of forming an aperture in a tray to restrain the dish while allowing it to be lifted by a heater shelf positioned under the tray. Although the aforementioned techniques of heating a dish are quite satisfactory, there are some potential users who would prefer a system which does not have a hole in the tray or a discontinuity in the outer rim of the tray through which liquid spilled on the tray could conceivably get on a passenger. For example, in some trays which have a hole through the tray bottom surface to support a dish, the tray bottom surface is not substantially continuous. It is thus possible, where such a tray has only a relatively narrow support portion at one end of the tray, that accidental movement of such narrow support portion beyond the edge of the tray table on which the tray is resting will cause the tray edge to drop quickly and cause a cup or glass of liquid on the tray to spill. Other potential users would prefer a system which eliminates all chance that a dish will not be properly positioned on the tray when the trays are being heated. It is quite unlikely that a dish will be bumped out of its proper position as a cart containing the trays is transported, for example, by a truck to an aircraft. However, it is possible, although it rarely happens, for a food service worker to carelessly fail to place a dish in its proper cooperative orientation relative to the tray, thus possibly preventing the dish from contacting the heater shelf and being properly heated. Other potential users are concerned about the expense of the specially shaped dishes required for the aforementioned systems. They are relatively expensive since they must have flat bottoms for good contact with the heater pads and must remain stable over numerous cooking cycles. Also, some difficulty exists when the in flight serving person picks up trays. In some cases the passenger has moved the hot dish out of its required position on the tray, thus causing interference with the heater shelves during reloading of the tray into the cart. Furthermore, most designs require reloading in a specific orientation, thus introducing an additional burden on the serving person as the trays are being returned to the carts after use.

An alternative to heating the food in a dish which must be lifted relative to a tray by a heater pad is to heat it in a formed recess in the tray, with the heat passing upwardly through the tray, as taught by U.S. Pat. No. 3,886,346 and by Tricault French Pat. No. 1,205,953. Although relatively low cost disposable trays are known and disclosed in U.S. Pat. No. 3,647,104, for example, it is preferable, from a performance and long term cost standpoint, that a heavier weight, temperature stable, reuseable tray be used. To facilitate cleaning of the tray and to avoid scratches and other damage to such a reuseable tray by a user's eating utensils, it is highly desirable to use a disposable insert dish in a tray recess, as disclosed by Tricault French Pat. No. 1,234,794 and U.S. Pat. Nos. 3,305,124, 3,877,603 and Re. 30,962.

It has been noted that food on a tray can be heated by applying heat under the tray. However, it would seem obvious that the bottom of such a tray could be quite hot to the touch if handled shortly after the heat source was disconnected. Such a situation could be expected in an aircraft, especially on a short flight where serving time is limited. Also, since most aircraft tray tables are made of low melting point plastics, such as ABS, a hot tray could damage a tray table on which it is placed. For example, it is desirable for microbiological purposes and palatability, to heat most foods to about 165°–185° F. (74°–185° C.). However, to achieve such a food temperature in a reasonable time in a particular prototype unit seems to require that the tray to be heated by a 300° F. (149° C.) surface temperature heater element. Obviously, however, the specific temperature achieved at the heater surface is dependent, for example, on heater surface area, watt density, the materials being heated and the total heating time. Such heating could cause the bottom surface of the tray to reach a temperature of about 200°–210° F. (93°–99° C.). Naturally, manual contact with the bottom of a tray while at such a high temperature should be avoided. If a heat conductive, fast cooling material is used for the tray, the tray bottom would cool relatively quickly but it would also quickly extract heat from the food, rendering it less palatable. If a material with low heat conductivity is used, the heating time required would be increased considerably.

SUMMARY OF THE INVENTION

It is among the objects of the present invention to provide a food service system which utilizes a tray which is adapted to be heated in a closed cart and which will permit food which is located either directly in one or more covered dish-shaped recesses formed integrally in the tray, or preferably, in inserts in such recesses, to be heated by one or more heater pads or other sources of heat applied under the tray, which heat passes through the tray and insert dish into the food while the other food items on the tray remain chilled. It is another object of the invention to provide such a tray which can keep food hot while eliminating the risk that a person handling the tray will be burned or that liquids spilled on the tray might not be contained. Yet another object is to provide a tray which has a cover for its hot food which can be easily removed and stored when the food is served. A further object is to provide a tray which will remain stable over long periods of use and whose dish-shaped recess will, when heated by an underlying heater pad, conform in shape to the heater pad so as to ensure uniform contact over its entire bottom surface and maximum heat transfer to the food within the recess. A still further object is to provide a tray which can be easily stacked for storage purposes as well as one which will interlock with an adjacent tray for ease of removal from the cart. An additional object is to provide a tray which can be reloaded into a service cart without requiring that the tray and cart shelves be specifically oriented, as is necessary with most prior art systems. The foregoing and other objects and advantages are attained by the food serving tray of the present invention which is preferably formed of a high quality molded plastic which can withstand the heat cycling to which the tray is subjected during use. One suitable material is a polyetherimid sold by General Electric under the trademark "ULTEM".

The tray has a molded plastic body portion which is formed with at least one integral, dish-shaped recessed portion in a first predetermined area thereof which is adapted to contain one or more food items to be heated. The aforementioned first predetermined area is located on the tray so that it will overlie a heater pad which is attached to the cart wall and positioned under the tray when the tray is in its operative position inside a cart. It should be understood, however, that the tray may include more than one dish-shaped recessed portion and the cart may include more than one heater pad for each tray. Furthermore, the heater pads for a single tray or for all of the trays on a single level may be selectively heated if desired. Also, the heater pads in different vertical zones of the cart could be selectively heated when a full cart of trays is not required. The tray, preferably, also has an integral recessed portion at a second predetermined area thereof which is adapted to contain items which are not to be heated, such as salads, desserts, cups and eating utensils. The dish-shaped recessed portion is preferably molded so that it has a generally flat bottom portion which has a wall thickness which is much thinner than other portions of the tray, and generally vertically extending side wall portions around its periphery. The side wall portions extend both above and below the plane of generally flat, horizontally disposed portions of the body portion which support the dish-shaped portion and are integrally joined to the said side wall portions externally thereof. The upwardly extending side wall portions are of a shape which is adapted to support the outwardly flanged upper edges of a disposable thin plastic insert dish and an insulating cover member which overlies and nests with the insert dish and which has a generally flat upper surface and generally vertically extending side wall portions. The side wall portions of the cover member preferably include a short horizontal offset portion intermediate their length which enhances the rigidity of the cover and which is the surface which rests on the insert dish.

For ease of manufacture and stackability, the "generally vertical" side walls of each of the tray, insert dish and cover are formed at a small draft angle. Furthermore, for reasons hereinafter explained, the "generally flat" bottom portion of the dish-shaped recessed portion is preferably formed with a slight upwardly bowed cross-section. The cover's side wall portions extend from the cover's top surface by a vertical dimension which is at least substantially no greater than the vertical dimension by which the lower portion of the side wall portions of the recessed portion extends below the said horizontally disposed portions of the body portion. Also, the vertical dimension of the portion of the sidewall of the cover which extends below the horizontal offset portion is at least substantially no greater than the vertical dimension by which the upper portion of the side wall portion of the dish-shaped recessed portion extends above the said horizontally disposed portions of the body portion.

It is preferred that the side walls of the dish-shaped recess and the cover be formed so as to have a complementary shape so that the cover can be removed from the top of the recess, or from the top of the insert dish therein, at the time the tray is served, and turned upside down and placed under the bottom surface of the recess to provide storage for the cover and insulation for the tray. In order to permit the tray to rest evenly on a table while the food thereon is being consumed, the dish-shaped recess preferably has its bottom surface located in a plane which is higher than the plane of the bottom surface of the recess in the second predetermined area of the tray. The preferred height difference between the planes is the thickness of the cover member. The cover element can be either reuseable or disposable but is preferably disposable. When disposable, it can be made of any suitable material but we have found that an ovenable paperboard or molded high temperature polystyrene works quite well. To minimize the height of the tray and insert dish and to provide clearance for foods that might extend above the upper edge of the dish-shaped recess and the insert dish therein, the cover preferably has the aforementioned horizontal offset portion located intermediate the length of its side walls which is adapted to rest on a horizontally extending flanged lip portion located just below the upper side edge of the insert dish. The inclusion of the offset in the side wall of the cover also increases the strength of the cover and makes it more rigid so that it will be better able to remain gripped by the retaining ribs on the bottom side of the dish-shaped recess while in its storage position.

It should also be noted that the various recessed portions of the tray are devoid of openings through which spills could reach the passenger. Also, since the bottom of the tray resides in a generally flat plane when the cover member is retained in an inverted fashion under the dish-shaped recessed portion, it is obvious that the tray may be returned to a food cart in either the same orientation in which it was removed or in an opposite orientation. This feature speeds up the reloading operation considerably.

BRIEF DESCRIPTION OF THE DRAWINGS

FIG. 4 is a vertical plan view showing the back edge of the tray;

FIG. 5 is a vertical plan view showing the opposite front edge of the tray;

FIG. 6 is a side vertical plan view of the left side of the tray showing how its lipped front and rear edges are at different heights to allow a plurality of trays to be assembled on a single cart shelf with their edges in overlying locked relationship so they can be pulled out of the cart together;

FIG. 7 is a cross-sectional view of the tray taken on line 7—7 of FIG. 1 with additional cart structure, including support rails and a pair of heater shelves, added to show the relationship between the tray, insert dish, cover and cart while the cart is in its heating mode;

FIG. 7A is an enlargement of a fragmentary portion of FIG. 7, and illustrates the relative thicknesses of the various elements; and FIG. 8 is a cross-sectional view taken on line 8—8 of FIG. 1, illustrating the cover member in the position it assumes during the serving mode when it functions as a tray bottom insulator, and also illustrating the dome-shaped cross-section which the bottom surface of the dish-shaped recess portion has when cool.

DETAILED DESCRIPTION OF THE PREFERRED EMBODIMENT

Figure 1:
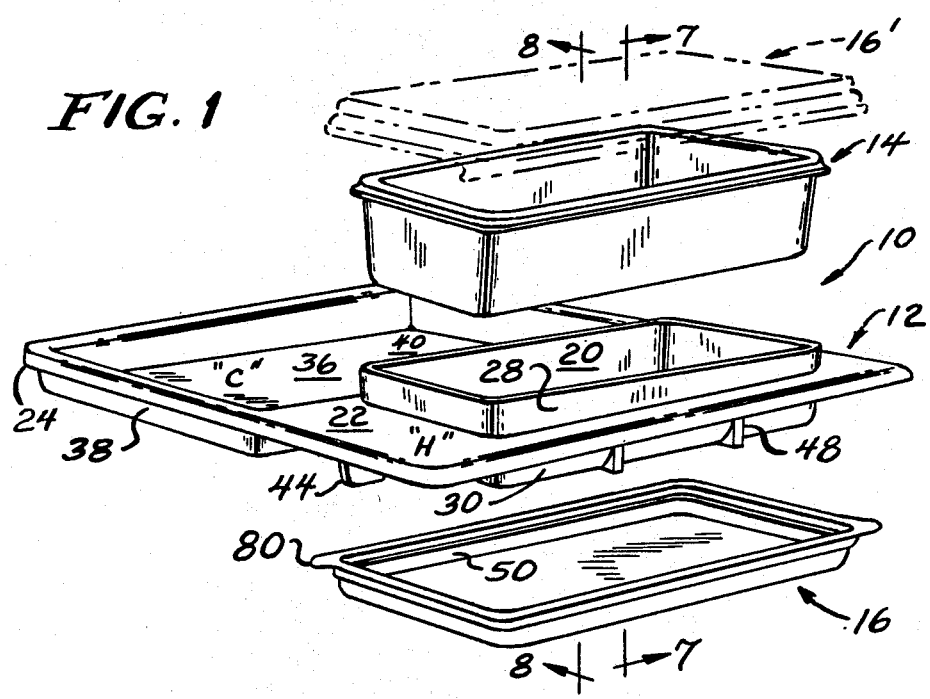
FIG. 1 is an exploded perspective view of a tray assembly comprising the improved food tray and a disposable insert dish and cover which is adapted to be used with it, the cover being shown in phantom in its heating position where it covers the insert dish, and in solid lines in its use position under the tray where it serves to insulate the hot bottom of the tray.

Referring to FIG. 1, the tray assembly indicated generally at 10 can be seen, in an exploded relationship, as including a molded food serving tray member indicated generally at 12, and an insert dish 14, preferably disposable, which is sized so as to fit within a formed recess portion 20 in the tray member. The tray assembly 10 also includes a cover member, which is also preferably disposable. The cover member is shown in phantom lines at 16' in the normal use orientation it assumes when the tray is being heated. The cover member is alternatively used, during serving, as a bottom insulator for the tray, as shown in solid lines at 16. In the serving position, the cover is inverted and stored under the tray, as best seen in FIG. 8. In this position, it not only protects persons handling the tray from being burned but also helps retain heat in the food. Storing the cover under the tray also eliminates the problem of the food server having to find another place to put it after it is removed from the top of the food dish. The tray member 12 comprises a generally flat, generally horizontally disposed body portion 22 which has downwardly extending edge flange or lip portions 24 which strengthen it and facilitate its handling. The recess portion 20 is formed in a first predetermined "hot" area "H" of the tray and includes side wall portions 28, 30 which extend upwardly and downwardly, respectively, relative to the plane of the body portion 22. The recess portion 20 also has a bottom wall portion 32 which is preferably thinner than other portions of the tray and which, in vertical cross-section, is upwardly bowed, as shown in FIG. 8. A second predetermined "cold" area "C" of the tray comprises a recessed portion 36 having downwardly extending side wall portions 38 and a flat bottom wall portion 40. Integral rib members 44, 46 extend downwardly from the body portion 22 and are horizontally spaced from the recess portion 20 so as to provide a clearance which permits the cover member 16 to be pushed up onto the lower portion of the recess portion which depends downwardly from the body portion 22. The cover member 16 functions to insulate the underneath surface of the recess portion during serving of the tray. It is retained in position under the recess portion 20 by a plurality of rib portions 48 which extend outwardly from the recess portion and which are sized so as to resiliently deform and frictionally engage the side wall flange portions 50 of the cover member. The rib members 44, 46 function as a horizontal extension of the recess portion 20 and facilitate the loading of the tray onto the heater shelves 62 of a tray cart 58 (FIG. 7) since they extend to about the same distance from the side edges of the tray as do the walls 38 of the recessed portion 36. The rib members 44, 46 also protect the downwardly projecting lower side walls 30 of the recess portion 20 from being slammed against the end surface of a heater shelf if the tray should accidently be tilted with its "hot" side lowermost as it is loaded into a cart. The rib members 44, 46 preferably extend downwardly slightly less than the side walls 30 of the recess portion 20 so as to ensure that they cannot prevent the bottom surface 32 of the recess portion from resting directly on a heater pad 64 when the tray is being heated.

Figure 2:
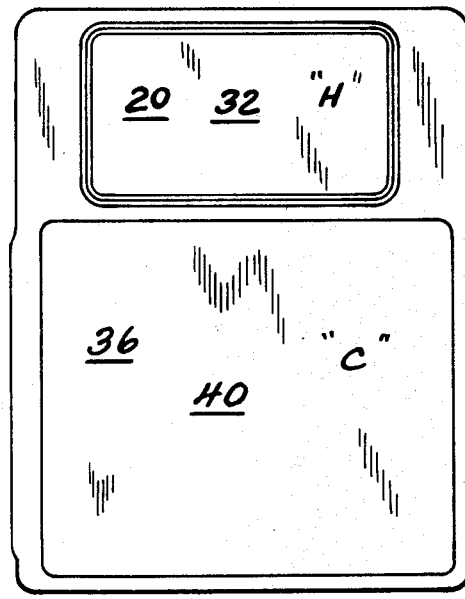
FIG. 2 is a top plan view of the food tray with its front edge, which normally faces the passenger, at the left.
Figure 3:
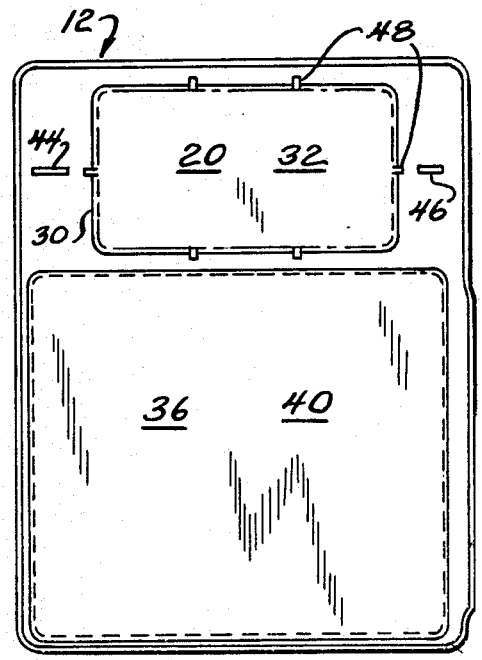
FIG. 3 is a bottom plan view of the food tray.

Referring to FIGS. 2 and 3, the details of the top and bottom of the tray 12, respectively, can be seen quite clearly. Assuming that a hot entree will be placed into the recess 20, and that silverware, cups and food to be served cold will be placed into the recess 36, the long edge of the tray which is shown to the left in FIG. 2 is the edge which will normally face the passenger who is eating from the tray and is herein considered to be the "front" edge. Since the tray must be able to withstand numerous heating, serving and washing cycles, it is preferably formed by molding from a stable, high quality plastic material such as the aforementioned "Ultem" material. By using injection molding, the tray can be formed with a thin bottom wall 32 which is much thinner than other portions of the tray so as to facilitate the transfer of heat to the insert dish 14. This thin bottom wall is preferably formed so as to be normally upwardly bowed so as to at least substantially exactly match, and thus cancel out, the downward bowing which takes place during heating. Other portions of the tray are preferably made thicker to increase their rigidity. It would, however, be possible to make the trays of other suitable materials and by other techniques, such as vacuum forming.

FIGS. 4 and 5 are views showing the rear and front edges of the tray, respectively. It can be seen in FIG. 5 that the bottom surface 32 of the recess portion 20 of the tray is spaced above the bottom surface 40 of the recess portion 36 by a distance d. The particular spacing dimension is selected to accommodate the thickness of the cover member 16 so that when the tray is placed on a table with a cover member attached to the bottom of the recess portion 20, the right and left bottom surfaces of the tray will be generally co-planar. A downward extension 54 of the front edge flange or lip portion 24" serves to engage and retain an adjacently positioned tray 12' on the same shelf of a tray cart, as best shown in FIG. 6.

FIG. 6 shows that the flat, generally horizontally disposed body portion 22 is actually positioned at a slight angle from the left to right side edges of the tray. This angle permits the flange extension 54 on the higher flanged side edge portion 24" to overlie the lower flanged side edge portion 24' of an adjacent tray 12' in the region of the recess 36'. Thus, a plurality of trays 12, 12' can be pushed onto a shelf 62 of a service cart so that the flange extension 54 on tray 12 will ramp up and over the edge of a tray 12' that was previously loaded. The resulting locking relationship allows the person serving the trays to pull out on the closest tray and have the following trays simultaneously moved into a position at the edge of the cart where they can be easily removed. This feature avoids the necessity of reaching into the cart to get the remaining trays.

FIG. 7 illustrates a cross-section of the tray taken on line 7—7 of FIG. 1 but adds a fragmentary portion of the walls of a cart 58 in which the tray might be heated, including guide rails 60 and heater shelves 62 having flat heater pad portions 64. It can be seen that the bottom wall 32 of the recess portion 20 is shown as flat, a position the plastic would assume when heated, as compared to the domed or upwardly bowed shape shown in FIG. 8 which the plastic is formed into when made and which it assumes when it returns to ambient temperatures.

FIG. 8 illustrates a cross-section of the tray taken on line 8—8 of FIG. 1 when the tray is not being heated and is cool enough that the bottom surface 32 of the recess portion 20 has returned to its normal, upwardly bowed cross-section. The figure also shows how the insulating cover member 16 is retained in nesting contact with the bottom portion of the recess portion by means of the rib portions 48 on the recessed portion engaging and resiliently depressing the vertical side wall portions 50 of the cover. The reason for forming the bottom wall surface 32 in the upwardly bowed shape shown is to accommodate temperature expansion during the heating cycle. Since only the bottom wall 32 of the recess portion 20 is heated, while the remainder of the plastic tray remains chilled, the bottom wall will normally tend to bow downwardly as it expands during heating. By forming it initially with a predetermined amount of upward bow, it can be made to end up flat after it bows downwardly during heating. Where the tray is formed of "Ultem" thermoplastic material, a bowing of about 0.015 in. (0.59 mm) seems to perform quite well. The bottom wall surface 32 is preferably of much less thickness than the remainder of tray 12 to facilitate transfer of heat to the food in the insert dish 14. For example, in the aforementioned prototype tray, the bottom wall surface 32 has a thickness of 0.060 in. (1.52 mm) as compared to a thickness of 0.100 in. (2.54 mm) for the bottom wall surface 40. Since the insert dish 14 is rigidly supported by the dish-shaped recess portion 20 it may have walls which are quite thin, such as 0.020 in. (0.51 mm) to better facilitate heat transfer to the food therein and to minimize the cost of the insert dish. The insert dish may be made of any suitable material, such as PET, for example. It has a down turned flange portion 70 at its upper edge which provides rigidity and is adapted to overlie the upper edge of the tray side wall portion 28. The desirability of having the bottom wall surface 32 of the tray thin has been previously addressed. To achieve a good balance between the enhanced heat transfer efficiency of a thinner surface and the enhanced strength of a thicker surface, it is preferred to have the thickness of bottom wall surface 32 less than about 75% of the thickness of bottom wall surface 40. It is even more preferable to make bottom wall surface 32 with a thickness no greater than about 60% of the thickness of bottom wall surface 40. The cover 16 preferably has a thickness of about 0.050 in. (1.27 mm) and is provided with side walls which include offset vertical portions 50, 74 and an intermediate horizontal portion 76. As best seen in enlarged view 7A, the horizontal portion 76 of the cover 16 is adapted to overlie and be supported by the upper flange portion 70 of the insert dish. Enlarged tab portions 80 formed at the ends of the cover, as best seen in FIG. 1, facilitate its removal. The offset cross-sectional configuration of the cover side wall increases its stiffness, thus helping the cover to remain in firm engagement with the tray ribs 48 when in its storage position under the tray. The offset portion 76 also allows the cover to cooperate in a better manner with the tray, even when the tray side walls 28 have a substantial draft angle. This cooperation is a result of the innermost vertical wall portions 50 engaging the tray ribs 48 while the outermost vertical wall portion 74 passes outside the outer edges 70 of the insert dish. The overlapping relationship with the insert dish enhances the retention of the cover and minimizes the chance that cold air can get into the dish while it is covered.

I claim:

1. In a food serving tray having at least one dish-shaped portion including a bottom wall portion and side wall portions extending downwardly therefrom, the top of which said at least one dish-shaped recessed portion is normally covered by an insulating cover member which includes generally vertically extending side wall portions, the improvement comprising retention means formed on the lower outside portions of the wall portions of said tray which are adapted to frictionally engage and retain complementary portions of said generally vertically extending side wall portions of said insulating cover member when it is inverted and placed under said at least one dish-shaped recessed portion.

2. A food serving tray of the type disclosed in claim 1 wherein said retention means comprises a plurality of outwardly projecting rib portions.

3. A food serving tray of the type disclosed in claim 1 wherein said bottom wall portion of said at least one dish-shaped recess portion is thinner than said side wall portions.

4. A food serving tray of the type disclosed in claim 1 wherein said tray further includes an additional recessed portion extending downwardly therefrom, said additional recessed portion having a bottom wall portion which extends downwardly to a greater extent than does said dish-shaped recessed portion.

5. A food serving tray of the type disclosed in claim 4 wherein the bottom wall portions of said at least one dish-shaped recessed portion and said additional recessed portion are vertically spaced relative to each other by a dimension generally equal to the thickness of said insulating cover member.

6. A food serving tray of the type disclosed in claim 5 wherein all of the recessed portions of the tray are devoid of openings through which liquid could spill on the tray.

7. In a food serving tray of the type adapted to be used to support portions of food which are normally covered by an insulating cover member, for selective heating by a flat surfaced heater means located on a heater shelf extending generally horizontally from a side wall of a food service cart, the improvement comprising a molded plastic tray body portion having at least one integral, dish-shaped, recessed portion formed in a first predetermined area of the body portion, said at least one dish-shaped recessed portion being defined by a thin, relatively flat bottom surface and side wall portions around its periphery which extend both above and below the plane of generally flat, generally horizontally disposed portions of the body portion which are integrally joined to the side wall portions of the recessed portion exteriorly thereof, said horizontally disposed portions serving to support the said at least one dish-shaped recessed portion relative to the remainder of the tray body portion, the upper edges of said side wall portions being adapted to provide support for said insulating cover member which is adapted to be used with said tray and which has an upper surface and generally vertically extending side wall portions extending from said upper surface which are of a total vertical dimension which is no greater than the minimum vertical dimension by which the lower portion of the outer side of said side wall portions of said at least one recessed portion extends below said generally flat portions of said body portion, said first predetermined area being located relative to the edges of said tray, so that, when said tray is loaded into a food service cart, the relatively flat bottom surface of said at least one dish-shaped, recessed portion can be positioned directly over a flat surfaced heater means located on a shelf of the cart, and means on the lower portion of the outer side of said side wall portions of said at least one dish-shaped recessed portion which are adapted to cooperate with said insulating cover member with which the tray is adapted to be used for receiving and retaining the insulating cover member in an inverted position under the tray when the tray is removed from the cart for serving.

8. A food serving tray of the type disclosed in claim 7 characterized in that the body portion of the tray includes a second predetermined area which defines a recessed generally flat bottomed portion which is located at a level which is lower than that of said horizontally disposed portions.

9. A food serving tray of the type disclosed in claim 8 characterized in that said recessed flat bottomed portion in said second predetermined area is located at a level which is lower than the level of the bottom surface of said at least one dish-shaped recessed portion.

10. A food serving tray of the type disclosed in claim 9 wherein all of the recessed portions of the tray are devoid of openings through which liquid could spill on the tray.

11. A food serving tray of the type disclosed in claim 9 characterized in that the difference in levels of the portions located in said first and second predetermined areas is generally equal to the thickness of the upper surface of said insulating cover member of the type which is adapted to be used to cover said at least one dish-shaped recessed portion.

12. A food serving tray of the type disclosed in claim 7 wherein said at least one dish-shaped recessed portion is spaced from each of a pair of opposed edges of the tray in a direction parallel to the side walls of a food cart into which it is adapted to be loaded, said tray having at least one rib extending downwardly therefrom in each of the regions thereof which are located between said pair of opposed edges and said at least one dish-shaped recessed portion, said at least one rib being spaced from said at least one dish-shaped recessed portion by at least the thickness of the side wall portions of the insulating cover member and having a bottom edge which extends downwardly no further than an imaginary plane containing the bottom surface of said at least one dish-shaped recessed portion.

13. A food serving tray of the type disclosed in claim 12 wherein one of said pair of opposed edges is higher than the other and shaped so that the higher edge of one tray will overlap and interlock with the lower edge of an adjacent tray as the trays are loaded into a food service cart, said interlocking of edges permitting a first tray to pull a second tray towards the exit opening of the cart as the first tray is removed from the cart.

14. A food serving tray of the type disclosed in claim 7 wherein said relatively flat bottom surface of said at least one dish-shaped recessed portion is normally bowed upwardly at its center but assumes a flat planar shape when positioned in overlying heating contact with a flat surfaced heater means.

15. A food serving tray of the type disclosed in claim 14 wherein said flat bottom surface of said at least one dish-shaped recessed portion is of less thickness than the flat bottomed portion of said second predetermined area of said tray.

16. A food serving tray of the type disclosed in claim 15 wherein said flat bottom surface of said at least one dish-shaped recessed portion has a thickness which is less than about 75% of the thickness of the flat bottomed portion of said second predetermined area of said tray.

17. A food serving tray of the type disclosed in claim 16 wherein said flat bottom surface of said at least one dish-shaped recessed portion has a thickness which is no greater than about 60% of the thickness of the flat bottomed portion of said second predetermined area of said tray.

18. In an assembly of a food serving tray of the type adapted to be used to support covered portions of food for selective heating by a flat surfaced heater means located on a heater shelf extending generally horizontally from a side wall of a food service cart, and an insulating cover for said food serving tray, the improvement comprising a molded plastic tray body portion having at least one integral, dish-shaped, recessed portion formed in a first predetermined area of the body portion, said at least one dish-shaped recessed portion being defined by a thin, relatively flat bottom surface and side wall portions around its periphery which extend both above and below support portions of the body portion which are integrally joined to the side wall portions of the recessed portion exteriorly thereof, said support portions serving to support said at least one dish-shaped recessed portion relative to the remainder of the tray body portion, the upper edges of said side wall portions being adapted to provide support for said insulating cover member, said insulating cover member having a flat upper surface and generally vertically extending side wall portions which are of a total vertical dimension which is substantially no greater than the vertical dimension by which the lower portion of the outer side of said side wall portions of said at least one dish-shaped recessed portions extend below said generally flat portions of said body portion, said first predetermined area being located relative to the edges of said tray, so that, when said tray is loaded into a food service cart, the relatively flat bottom surface of said at least one dish-shaped, recessed portion can be positioned directly over a flat surfaced heater means located on a shelf of the cart, said lower portion of said outer side of said side wall portions being shaped to be at least generally complementary to at least a portion of said generally vertically extending side wall portions of said insulating cover member and including means for retaining said cover member when it is inverted.

19. An assembly of the type disclosed in claim 18 wherein the body portion of the tray further includes a second predetermined area which defines a generally flat bottomed recessed portion which is located at a level which is lower that that of said horizontally disposed portions, each of said recessed portions being devoid of openings through which liquid could spill from the tray, said tray having its bottom surface in a generally flat plane when said cover member is inverted and retained under said at least one dish-shaped, recessed portion, whereby said tray can, if desired, be reloaded into a food service cart in an orientation opposite to that which it had when removed.

20. An assembly of the type disclosed in claim 18 wherein said at least one dish-shaped recessed portion is adapted to receive a thin plastic insert dish having an outwardly extending flanged lip portion at its upper end, said insulating cover member having an outwardly extending horizontal flange portion intermediate the ends of its generally vertically extending side wall portions which is adapted to rest on said outwardly extending flanged lip portion of said insert dish.

21. In a generally planar food serving tray of the type in which a dish-shaped portion is recessed below the plane of said tray and is adapted to be covered by a cover member which has generally vertically extending side wall portions around its periphery and wherein said dish-shaped portion has sidewalls having inner and outer portions thereof terminating in a bottom wall, the improvement comprising cover retaining means formed on the recessed outside portions of said side walls, said cover retaining means being in the form of outwardly projecting portions which are adapted to engage and frictionally retain complementary portions of the vertically extending side wall portions of an inverted cover member with which the tray is adapted to be used.

* * * * *